United States Patent Office 3,136,760
Patented June 9, 1964

3,136,760
16-ALKYLENE PREGNENE DERIVATIVES
Norman L. Wendler, Summit, and David Taub and Robert D. Hoffsommer, Jr., Metuchen, N.J., assignors to Merck & Co., Inc., Rahway, N.J., a corporation of New Jersey
No Drawing. Filed Mar. 24, 1959, Ser. No. 801,429
1 Claim. (Cl. 260—239.55)

This invention is concerned generally with novel steroid compounds and with processes of preparing the same, more particularly, it relates to 16-alkylene-11-oxygenated steroids of the pregnane series unsaturated in ring A and to novel processes for producing 16-alkylene steroids.

The new products of our invention may be represented by the following structural formula:

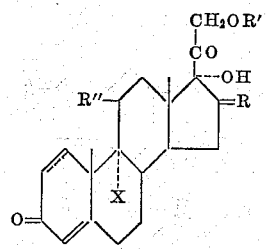

wherein R is alkylene, R' is hydrogen or acyl, R" is hydroxy or oxygen, and X is hydrogen or halogen. The broken line between carbon atoms 1 and 2 indicates that a double bond may be present in this position.

The 16-alkylene steroids produced in accordance with the present invention possess extremely high anti-inflammatory activity, considerably greater than that of the parent steroids, and are especially effective for the treatment of arthritis and related diseases since they can be administered for their cortisone-like action in low dosage thereby minimizing undesired side effects.

In preparing our novel chemical compounds, the starting material utilized may be a 3-substituted-17α-hydroxy-11-oxygenated-16-alkylene-20-pregnanone- or 3 - substituted-17α-hydroxy-11-oxygenated-16 - alkylene - 20 - allopregnanone which may be identified by the following structural formula:

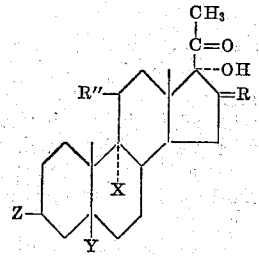

wherein X is hydrogen or halogen, Y is alpha or beta hydrogen, Z is oxygen, dioxolane, alpha or beta acyloxy or hydroxy, R is alkylene, and R" is hydroxy or oxygen as above, with or without a double bond at the 5(6)-position.

In a preferred embodiment of our invention, 16-alkylene-3α,17α-dihydroxy-11,20-pregnanedione which is represented by the following formula:

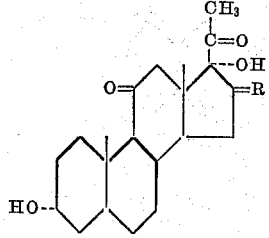

is utilized as the starting material. However, it is clear to those skilled in the art that other starting materials, such as those described above, may be similarly converted to the desired end products.

It has been found that 16-alkylene-3α,17α-dihydroxy-11,20-pregnanedione may be caused to react with bromine in a chloroform medium to form 16-alkylene-21-bromo-3α,17α-dihydroxy-11,20-pregnanedione which has the following formula:

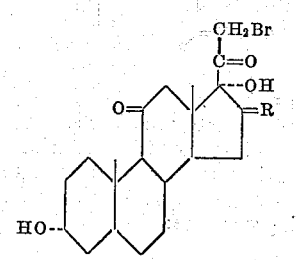

wherein R is as above.

Treatment of the above 16-alkylene-21-bromo-3α,17α-dihydroxy-11,20-pregnanedione with potassium iodide, potassium acetate and acetic acid in acetone yields 16-alkylene-3α,17α,21-trihydroxy-11,20 - pregnanedione - 21-acetate which may be represented graphically as follows:

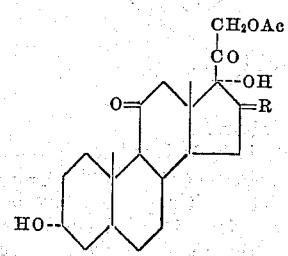

Oxidation of 16-alkylene-3α,17α,21-trihydroxy-11,20-pregnanedione 21-acetate with sodium dichromate results in the formation of 16-alkylene-17α,21-dihydroxy-3,11,20-pregnanetrione 21-acetate which has the following structural formula:

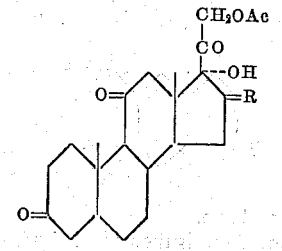

wherein R is as above.

Treatment of 16-alkylene-17α,21 - dihydroxy - 3,11,20-pregnanetrione 21-acetate with 1 mole of bromine yields 16-alkylene-4-bromo-17α,21-dihydroxy-3,11,20- pregnanetrione which has the following structural formula:

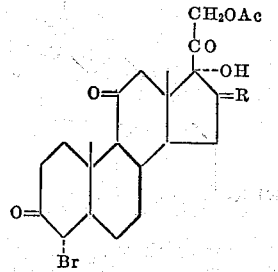

wherein R is as above.

Reaction of the above 16-alkylene-4-bromo-17α-21-bromo-17α,21-dihydroxy-3,11,20-pregnanetrione 21 - acetate with semicarbazide hydrohalide results in the formation of the 3-semicarbazone of 16-alkylene-17α,21-dihydroxy-4-pregnene-3,11,20-trione 21-acetate which may be represented by the following formula:

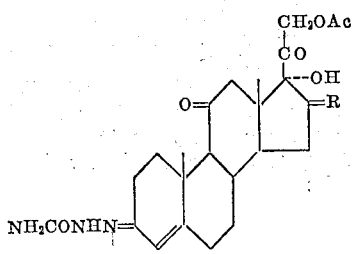

wherein R is as above.

Upon reacting the latter semicarbazone of 16-alkylene-17α,21-dihydroxy-4-pregnene-3,11,20-trione with aqueous acetic acid-pyruvic acid there is formed 16-alkylene-17α,21-dihydroxy-4-pregnene-3,11,20-trione 21-acetate which has the following structure:

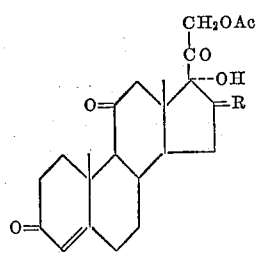

wherein R is as above.

The 21-acetate is hydrolyzed to the alcohol by treatment of 16-alkylene-17α,21-dihydroxy-4-pregnene-3,11,20-trione 21-acetate with potassium bicarbonate in aqueous methanol to yield 16-alkylene-17α,21-dihydroxy-4-pregnene-3,11,20-trione which may be represented by the following structural formula:

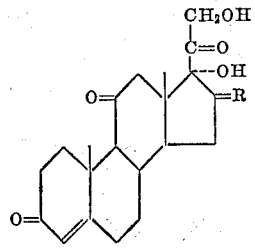

wherein R is as above.

The latter compound is then reacted with semicarbazide hydrochloride in methanol-dimethylformamide to form the 3,20-disemicarbazone of 16-alkylene-17α,21-dihydroxy-4-pregnene-3,11,20-trione which has the following structural formula:

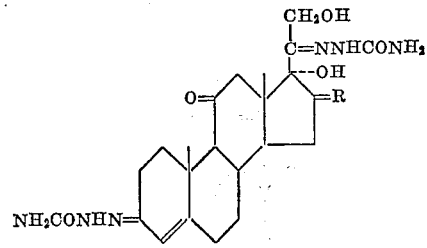

wherein R is alkylene as above.

Reduction of the 3,20-disemicarbazone of 16-alkylene-17α,21-dihydroxy-4-pregnene-3,11,20-trione with sodium boronhydride produces the 3,20-disemicarbazone of 16-alkylene-11β,17α,21-trihydroxy-4-pregnene-3,20-dione, which has the following formula:

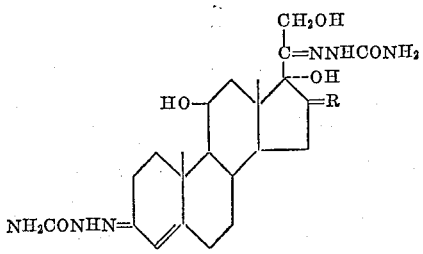

wherein R is as above.

The 3,20-disemicarbazone of 16-alkylene-11β,17α,21-tri-hydroxy-4-pregnene-3,20-dione is reacted with pyruvic acid in aqueous acetic acid to remove the semicarbazone groups at the 3 and 20-positions to form 16-alkylene-11β,17α,21-trihydroxy-4-pregnene-3,20-dione which may be chemically represented as follows:

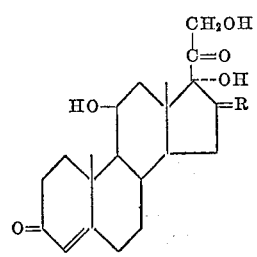

wherein R is as above. The above compound which may be called 16-alkylene hydrocortisone has been found to exhibit marked and effective activity in the treatment of arthritis.

Acetylation of 16-alkylene-11β,17α,21-trihydroxy-4-pregnene-3,20-dione at the 21-position is accomplished by reacting this latter compound with acetic anhydride in the presence of pyridine to form 16-alkylene-11β,17α,21-trihydroxy-4-pregnene-3,20-dione 21-acetate which may be represented as follows:

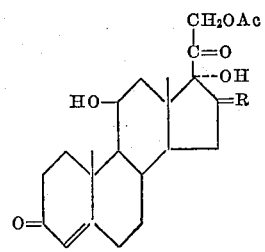

wherein R is as above.

Other 21-acylates such as the propionate, t-butyl acetate or benzoate may be prepared by reacting the 21-alcohol with the appropriate acyl anhydrides.

The 16-alkylene-17α,21-dihydroxy-3,11,20-pregnanetrione 21-acetate may be reacted with 2 molecules of bromine to form 16-alkylene-2,4-dibromo-17α,21-dihydroxypregnane-3,11,20-trione 21-acetate which may be represented by the following formula:

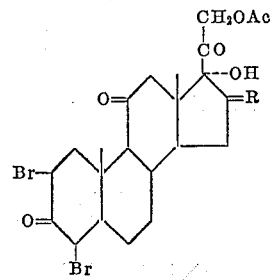

wherein R is as above.

Treatment of the above compound with dimethyl aniline in dimethylformamide results in the desired 16-alkylene-17α,21-dihydroxy-1,4-pregnadiene-3,11,20-trione- 21-acetate represented by the following formula:

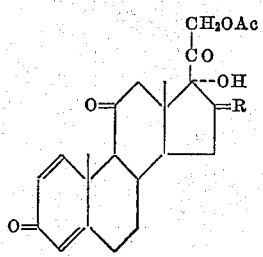

wherein R is as above. The 21-acetate can be readily converted to the corresponding 21-ol by hydrolysis, for example, in aqueous methanolic potassium bicarbonate to give 16-alkylene-17α,21-dihydroxy-1,4-pregnadiene-3,11,20-trione represented by the following formula wherein R is as above.

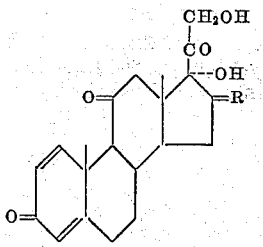

In accordance with this invention, other 16-alkylene-17α,21 - dihydroxy-11-oxygenated-1,4-pregnadiene-3,20-diones and 16β-alkylene-9α-fluoro-17α,21-dihydroxy-11-oxygenated-1,4-pregnadiene-3,20-diones and the corresponding 21-acylates can similarly be prepared by reacting respectively 16-alkylene-17α,21-dihydroxy-11-oxygenated-pregnane-3,20-dione 21-acetate and 16-alkylene-9α-fluoro-17α,21-dihydroxy-11-oxygenated pregnane-3,20-dione 21-acetate with 2 moles of bromine to form the corresponding 16-alkylene-2,4-dibromo-17α,21-dihydroxy-11-oxygenated-pregnane-3,20-dione 21-acetate which have the following structural formula:

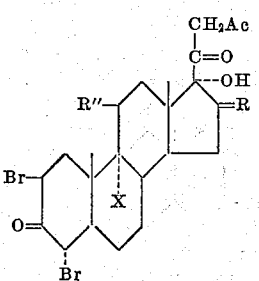

wherein R is as above and X is hydrogen or fluorine and R'' is hydroxy or oxygen.

Treatment of these species with dimethyl aniline in dimethylformamide results in the desired 16-alkylene-17α, 21 - dihydroxy-11-oxygenated-1,4-pregnadiene-3,20-dione 21-acetate and 16-alkylene-9α-fluoro-17α,21-dihydroxy-11 - oxygenated - 1,4-pregnadiene-3,20-dione 21-acetate which may be represented graphically as follows:

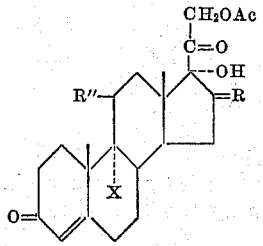

wherein R, R'' and X are as above. The species represented by the above formula are highly potent anti-inflammatory agents.

The 21-acetate esters of these compounds can be hydrolyzed to the corresponding alcohols, 16-alkylene-17α, 21 - dihydroxy-11-oxygenated-1,4-pregnadiene-3,20-dione and 16-alkylene-9α-fluoro-17α,21-dihydroxy-11-oxygenated-1,4-pregnadiene-3,20-dione represented by the following structural formula:

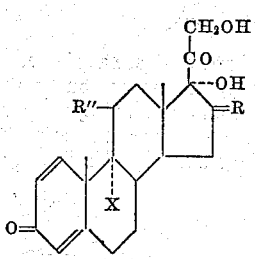

wherein R and R'' are as above.

The 16-alkylene compounds described above may also be obtained from either the corresponding 16α or 16β-alkyl compounds of the following formula:

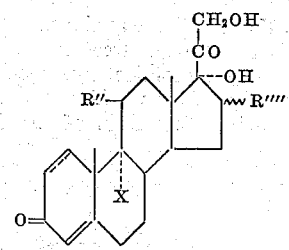

in which R'', X are as above and R'''' is alkyl.

Treatment of this compound with semicarbazide base and semicarbazide hydrochloride leads to the corresponding 3,20-disemicarbazone of the following formula:

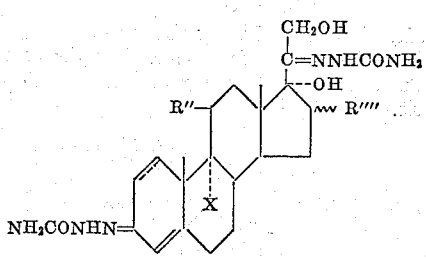

wherein R'', X and R'''' are as above.

The latter 3,20-disemicarbazone on heating in acetic acid and acetic anhydride is converted into the corresponding 16-unsaturated 3,20-disemicarbazone of the following formula:

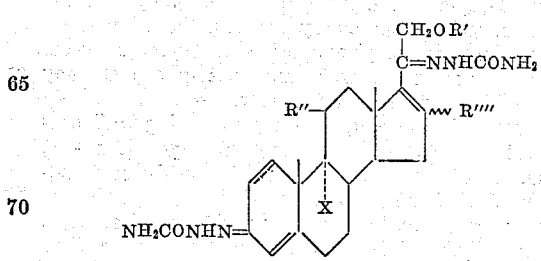

wherein R', R'', X and R'''' are as above.

The latter 16-unsaturated semicarbazone on treatment with hot aqueous acetic acid is converted to the corresponding 3,20-dione of the following formula:

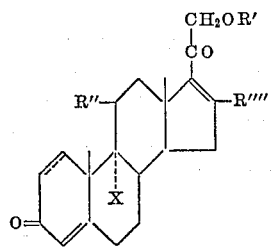

wherein R′, R″, X and R″″ are as above.

The latter compound on treatment with alkaline hydrogen peroxide or an alkyl hydroperoxide in the presence of a base or an organic peracid is converted into the corresponding 16α,17α-oxide of the following formula:

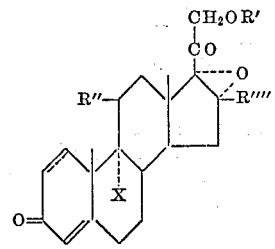

wherein R′, R″, X and R″″ are as above.

The above 16α,17α-oxide on treatment with strong acid, for example, hydrogen bromide, hydrogen chloride, hydrogen fluoride or perchloric acid is converted into the corresponding 16-alkylene steroid of the following formula:

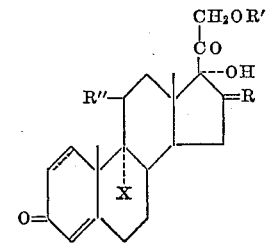

wherein R, R′, R″ and X are as above.

The 21-acetates may be converted to the corresponding 21-alcohols of the following formula by acid or basic hydrolysis.

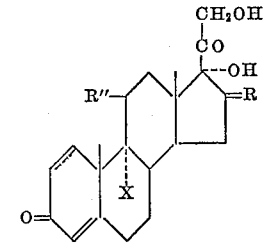

R, R″ and X are as above.

Other 21-acylates e.g. the propionate, t-butyl acetate, benzoate may be prepared by reacting the 21-alcohols with the appropriate acyl anhydride. Also the 21-esters with inorganic acids e.g. the 21-sulfate, 21-phosphate may be prepared in the appropriate manner.

This process is especially useful in preparing 9α-fluoro-11β,17α,21-trihydroxy-16-methylene-1,4-pregnadiene - 3, 20-dione, 9α-fluoro-11β,17α,21-trihydroxy-16-methylene-4-pregnene-3,20-dione and 16-methylene prednisolone from their respective 16α-methyl or 16β-methyl analogs.

Alternatively, the 1,4-pregnadiene compounds described above may be prepared from the corresponding 4-pregnene-3-ones by dehydrogenation chemically or microbially by means of *Bacillus sphaericus*.

The starting material for the present process, namely, 3α,17α-dihydroxy-11-oxygenated-16-alkylene - 20 - pregnanone or the 3-acylate thereof can be prepared from the known 3α-hydroxy-16-pregnene-11,20-dione 3-acetate in accordance with the following procedure:

It has been found that 3α-hydroxy-16-pregnene-11,20-dione 3-acetate may be caused to react with diazoalkanes, such diazomethane and diazoethane to form 16α,17α-alkyleneazo-3α-hydroxy-11,20 - pregnanedione 3-acetate which has the following structural formula:

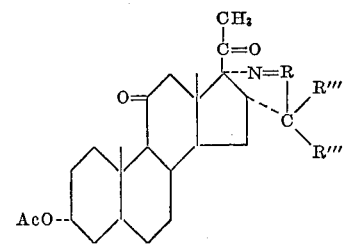

wherein R‴ is hydrogen or alkyl.

Upon heating 16α,17α-alkyleneazo-3α-hydroxy-11,20-pregnanedione 3-acetate, there is formed primarily 16-alkyl-3α-hydroxy-16-pregnene-11,20-dione 3-acetate which may be represented by the following formula:

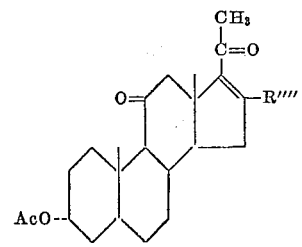

wherein R″″ is alkyl as above.

Treatment of 16-alkyl-3α-hydroxy-16-pregnene-11,20-dione 3-acetate, with an oxidizing agent such as hydrogen peroxide in the presence of sodium hydroxide or peracids such as peroxytrifluoracetic acid results in the formation of 16β-alkyl-16α,17α-epoxy-3α-hydroxy-11,20-pregnanedione which has the structural formula:

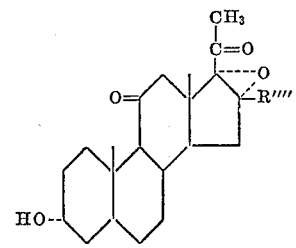

wherein R″″ is as above.

Room temperature acetylation gives 16β-alkyl-16α,17α-epoxy-3α-hydroxy-11,20-pregnanedione 3-acetate. Upon treatment with hydrogen bromide in acetic acid there is formed 16-alkylene-3α,17α-dihydroxy - 11,20 - pregnanedione 3-acetate which may be represented as follows:

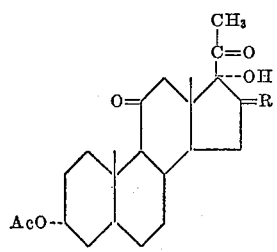

wherein R is as above.

Hydrolysis of this latter compound in aqueous methanolic potassium hydroxide leads to 16-alkylene-3α,17α- dihydroxy-11,20-pregnanedione represented by the following formula:

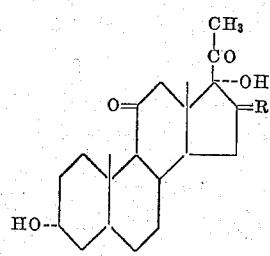

wherein R is as above.

The 16-alkylene steroids which possess extremely high anti-inflammatory activity may be administered orally, parenterally or topically. Thus, the active ingredient can be administered alone or may be associated with a carrier. A smaller quantity of the active 16-alkylene steroid may be administered to the patient and have the same therapeutic effect as larger quantities of other steroids such as cortisone or hydrocortisone. Any of the carriers used in pharmaceutical practice may be employed where there is no incompatibility with the active materials. The composition may take the form of tablets, powders, capsules, elixirs, syrups or other dosage forms which are particularly useful for oral ingestion. Liquid diluents are employed in sterile condition for parenteral use, namely, by injection. Such a medium may be a sterile solvent for the active material. For topical administration any of the known dermatologic vehicles may be employed. Such vehicles for external application include water-soluble ointment bases, oils, petrolatum and jellies.

The following experimental part illustrates in detail some of the compounds which constitute this invention and methods for their production. However, this invention is not to be construed as limited thereby in spirit or in scope since it will be apparent to those skilled in the art that many modifications in materials and methods may be made without departing from the invention.

EXAMPLE 1

*Preparation of 21-Bromo-3α,17α-Dihydroxy-16-Methylene-11,20-Pregnanedione 3-Acetate*

To a stirred solution of 209 mg. of 3α,17α-dihydroxy-16-methylene-11,20-pregnanedione 3-acetate (prepared as described hereinbelow) in 4 ml. of chloroform maintained at 40–45° C., is slowly added 85 mg. of bromine in 5 ml. of chloroform. Uptake of bromine is complete within 30 minutes. Ether is added and the mixture washed twice with cold 5% potassium bicarbonate solution. The organic extract is dried over magnesium sulfate and the colorless residue crystallized from acetone-ether gives colorless prisms of 21-bromo - 3α,17α - dihydroxy - 16-methylene-11,20-pregnanedione M.P. 195–200 dec.

*Analysis.*—Calculated for $C_{24}H_{33}O_5Br$: C, 59.88; H, 6.91; Br, 16.60. Found: C, 60.50; H, 6.85; Br, 15.86.

The 3α,17α - hydroxy - 16 - methylene - 11,20 - pregnanedione 3-acetate used as a starting material in this example, is prepared starting with the known 3α-hydroxy-16-pregnane-11,20-dione 3-acetate, in accordance with the following procedure:

In a 500 ml. 3-neck flask equipped with condenser, dropping funnel and nitrogen inlet are placed 20 g. of potassium hydroxide in 90 ml. of water, 100 ml. of methanol and 100 ml. of ether. A solution of 10 g. of N-methyl-N-nitrosotosylamide in 50 ml. of ether is placed in the dropping funnel.

Diazomethane is generated by warming the generation flask to 40–45° C. and cautiously adding the N-methyl-N-nitrosotosylamide-ether from the dropping funnel. Nitrogen is utilized to sweep the diazomethane into a solution of 20 g. of 3α-hydroxy-16-pregnene-11,20-dione 3-acetate in 100 ml. of tetrahydrofuran and 120 ml. ether. The process is continued until the steroid solution remains yellow for several hours. The product, 3α-hydroxy-16α,17α-methylene-azo-11,20-pregnanedione 3-acetate is largely precipitated from the reaction mixture. After 16 hours, the mixture is filtered, washed with ether and dried in air.

37.4 grams of 3α-hydroxy-16α,17α-methyleneazo-11,20-pregnanedione 3-acetate is placed in a 500 ml. round-bottom flask and heated by an oil bath in vacuo (pressure 0.6 mm.). A manometer and 12 liter surge flask are in the line between the reaction flask and pump trap. When the bath temperature reaches 180° C. the 3α-hydroxy-16α,17α-methyleneazo-11,20-pregnanedione 3-acetate begins to melt with evolution of nitrogen. The maximum pressure reached is 83 mm. After 10 minutes at 180–182° C. the melt is cooled. It has $\lambda_{max}^{CH_3OH}$ 

E% 191 and is taken up in about 150 ml. of acetone, filtered through diatomaceous earth, concentrated to about 100 ml. and ether is slowly added to the boiling solution until crystallization occurs. These crystals of 3α-hydroxy-16-methyl-16-pregnene-11,20-dione 3-acetate have a melting point of 165–168° C.

A solution of 20.0 g. of 3α-hydroxy-16-methyl-16-pregnene-11,20-dione 3-acetate dissolved in 600 ml. of methanol, is cooled to 18° C., and 80 ml. of 30% hydrogen peroxide followed by 80 ml. of 2.5 N sodium hydroxide are added. Considerable material precipitates from solution, but all redissolves on stirring the reaction mixture at 25°–30° C. for 40 minutes. The solution is kept at 15°–20° C. for 18 hours at which time the ultraviolet maximum at 249 has completely disappeared. Then 600 ml. of saturated salt water is slowly added, the crystalline precipitate is filtered, washed with water, and dried in air and in vacuum. The 16α,17α-epoxy-3α-hydroxy-16β-methyl-11,20-pregnanedione thus formed has a melting point of 176–177° C.

Room temperature acetylation gives the 3α-hydroxy-16α,17α-epoxy-16β-methyl-11,20-pregnanedione 3-acetate having a melting point of 162–164° C.

To a stirred solution of 5.05 g. of 3α-hydroxy-16α,17α-epoxy-16β-methyl-11,20-pregnanedione 3-acetate in 75 ml. of acetic acid maintained at 10–15° C. is added 25 ml. of cold 15% hydrogen bromide in acetic acid. After 35 minutes at 10°–15° C. the mixture is concentrated to dryness in vacuo (temperature 15° C.) and the residue chromatographed on 200 g. of neutral alumina.

From the 50:50 petroleum ether-benzene to 100% benzene eluates, there is obtained 1.60 g. 3α,17α-dihydroxy - 16 - methylene - 11,20 - pregnanedione 3-acetate; prisms from acetone-ether M.P. 198°–200° C.

EXAMPLE 2

*Preparation of 21-Bromo-3α,17α-Dihydroxy-16-Methylene-11,20-Pregnanedione*

To a stirred solution of 1.60 grams of 3α,17α-dihydroxy-16-methylene-11,20-pregnanedione (prepared as described hereinbelow) in 32 ml. of chloroform maintained at 30–35° C. is slowly added 840 mg. of bromine in 48 ml. of chloroform. Uptake of bromine is complete within 3 hours. Ether is added and the mixture washed twice with cold 5% potassium bicarbonate solution. The organic extract is dried over magnesium sulfate and the residue crystallized from acetone-ether to give 21 - bromo - 3α,17α - dihydroxy - 16 - methylene-11,20-pregnanedione. M.P. 190–198 dec.; $[\alpha]_D^{Chf.}+34°$.

*Analysis.*—Calcd. for $C_{22}H_{31}O_4Br$: C, 60.13; H, 7.11. Found: C, 60.31; H, 7.38.

The 3α,17α-dihydroxy-16-methylene-11,20-pregnanedione used as a starting material in this example is prepared starting with the 3α,17α-dihydroxy-16-methylene-11,20-pregnanedione 3-acetate prepared as described in Example 1 in accordance with the following procedure:

To a stirred solution of 3.00 g. of 3α,17α-dihydroxy-16-methylene-11,20-pregnanedione 3-acetate in 90 ml. of methanol under nitrogen is added 3.00 g. of potassium hydroxide in 1.5 ml. of water and 150 ml. of methanol. After 30 minutes at 25°, acetic acid (6 ml.) is added and the solvents removed in vacuo. The product is isolated by chloroform extraction and is crystallized from ether to yield 3α,17α-dihydroxy-16-methylene-11,20-pregnanedione, M.P. 160–162°; $[\alpha]_D^{Chf.}$ —34°.

Analysis.—Calcd. for $C_{22}H_{32}O_4$: C, 73.29; H, 8.99. Found: C, 72.76; H, 8.80.

EXAMPLE 3

*Preparation of 3α,17α,21-Trihydroxy-16-Methylene-11,20-Pregnanedione 3,21-Diacetate*

70 mg. of 21-bromo-3α,17α-dihydroxy-16-methylene-11,20-pregnanedione 3-acetate, 55 mg. of potassium iodide and 70 mg. of anhydrous potassium acetate in 5 ml. acetone and 0.1 ml. acetic acid are refluxed 2 hours. The mixture is concentrated to dryness in vacuo and partitioned between ethyl acetate and water. The ethyl acetate layer is washed with sodium chloride solution and dried over magnesium sulfate. Crystallization of the product from acetone-ether gives pure 3α,17α,21-trihydroxy-16-methylene-11,20-pregnanedione 3,21-diacetate, M.P. 228–230°, positive tetrazolium test.

Analysis.—Calculated for $C_{26}H_{36}O_7$: C, 67.80; H, 7.88. Found: C, 67.28; H, 7.75.

EXAMPLE 4

*Preparation of 3α,17α,21-Trihydroxy-16-Methylene-11,20-Pregnanedione 21-Acetate*

In the same manner as in Example 3, 21-bromo-3α,17α-dihydroxy-16-methylene-11,20-pregnanedione (1.42 g.) (prepared as described in Example 2) is converted to 3α,17α,21-trihydroxy-16-methyl-11,20-pregnanedione 21-acetate (1.28 g.), M.P. 172–175, $[\alpha]_D^{Chf.}$ +44.

Analysis.—Calcd. for $C_{24}H_{34}O_6$: C, 68.87; H, 8.18. Found: C, 68.47; H, 8.24.

EXAMPLE 5

*Preparation of 17α,21-Dihydroxy-16-Methylene-3,11,20-Pregnanetrione 21-Acetate*

To a solution of 600 mg. of 3α,17α,21-trihydroxy-16-methylene-11,20-pregnanedione 21-acetate in 16 ml. of acetic acid is added 284 mg. of sodium dichromate in 13 ml. of acetic acid. After 3 hours at 25° C., 50% saturated aqueous sodium chloride solution is slowly added. The precipitated product is filtered, washed with water, dried in air and recrystallized from acetone-ether to give pure 17α,21-dihydroxy-16-methylene-3,11,20-pregnanetrione 21-acetate, M.P. 202–210°.

EXAMPLE 6

*Preparation of 4-Bromo-17α,21-Dihydroxy-16-Methylene-3,11,20-Pregnanetrione*

To a stirred solution of 630 mg. of 17α,21-dihydroxy-16-methylene-3,11,20-pregnanetrione 21-acetate in 10 ml. of acetic acid and 8 ml. of chloroform kept at —10° C. is added 240 mg. of bromine in 6 ml. of chloroform. After addition is complete, 1.2 g. of sodium acetate in 7 ml. of cold water is added. Additional water is added and the mixture is extracted with chloroform. The chloroform extract is washed with dilute potassium bicarbonate, water, and dried over sodium sulfate. The residue is triturated with ether to give crystalline 4-bromo-17α,21-dihydroxy-16-methylene-3,11,20-pregnanetrione.

EXAMPLE 7

*Preparation of 3-Semicarbazone of 17α,21-Dihydroxy-16-Methylene-4-Pregnene-3,11,20-Trione 21-Acetate*

To 580 mg. of 4-bromo-17α,21-dihydroxy-16-methylene-3,11,20-pregnanetrione 21-acetate in 20 ml. of acetonitrile under nitrogen is added a slurry of 300 mg. of semicarbazide hydrochloride and 200 mg. sodium bicarbonate in 4 ml. of water. After 2 hours, the acetonitrile is removed in vacuo, water added and the crystalline 3-semicarbazone of 17α,21-dihydroxy-16-methylene-4-pregnene-3,11,20-trione 21-acetate is filtered, washed with water, and dried in air.

EXAMPLE 8

*Preparation of 17α,21-Dihydroxy-16-Methylene-4-Pregnene-3,11,20-Trione 21-Acetate (16-Methylene Cortisone Acetate)*

500 mg. of the semicarbazone of 17α,21-dihydroxy-16-methylene-4-pregnene-3,11,20-trione is dissolved in 20 ml. of acetic acid, 1.5 ml. of pyruvic acid and 5 ml. of water. After 18 hours at 25° C., water is added and the mixture is extracted with chloroform. The chloroform extract is washed with aqueous potassium bicarbonate, water, and dried over sodium sulfate. Removal of the solvent gives crude 17α,21-dihydroxy-16-methylene-4-pregnene-3,11,20-trione 21-acetate, which is purified by crystallization from acetone-ether.

EXAMPLE 9

*Preparation of 17α,21-Dihydroxy-16-Methylene-4-Pregnene-3,11,20-Trione (16-Methylene Cortisone)*

This compound is obtained by treatment of 500 mg. of the corresponding 21-acetate (the product of Example 8) in 15 ml. of methanol with 500 mg. of potassium bicarbonate in 5 ml. of water under nitrogen at reflux for 10 minutes. The mixture is cooled, neutralized with 0.5 ml. of acetic acid in 5 ml. of water, the methanol removed in vacuo and the product extracted into ethyl acetate. Concentration of the ethyl acetate gives crystalline 17α,21-dihydroxy-16-methylene-4-pregnene-3,11,20-trione.

EXAMPLE 10

*Preparation of 3,20-Disemicarbazone of 17α,21-Dihydroxy-16-Methylene-4-Pregnene-3,11,20-Trione*

To a stirred solution of 500 mg. of 17α,21-dihydroxy-16-methylene-4-pregnene-3,11,20-trione in 12.5 ml. of methanol and 3 ml. of dimethylformamide kept under nitrogen is added a slurry of 680 mg. of semicarbazide hydrochloride and 370 mg. of sodium bicarbonate in 1 ml. of water. The stirred mixture is refluxed 3½ hours and maintained at 45° C. for 17 hours. It is then cooled to 20° C. and 50 ml. of 50% saturated aqueous sodium chloride is added. After 2 hours at 0° C. the precipitate of the 3,20-disemicarbazone of 17α,21-dihydroxy-16-methylene-4-pregnene-3,11,20-trione 21-acetate is filtered, washed with water until free of chloride ion and dried in air.

EXAMPLE 11

*Preparation of the 3,20-Disemicarbazone of 11β,17α,21-Trihydroxy-16-Methylene-4-Pregnene-3,20-Dione*

To a stirred solution of 600 mg. of the 3,20-disemicarbazone of 17α,21-dihydroxy-16-methylene-4-pregnene-3,11,20-trione 21-acetate in 30 ml. of tetrahydrofuran and 11 ml. of water under nitrogen is added 200 mg. powdered sodium borohydride. The stirred suspension is refluxed 45 minutes and then cooled to 15° C. Aqueous acetic acid (3 ml. of 30%) is added cautiously and most of the tetrahydrofuran is removed in vacuum. Addition of 5 ml. of methanol and 5 ml. of water induces the product to crystallize. Following addition of 10 ml. of a saturated sodium chloride solution and aging at 0° C. the product 3,20-disemicarbazone of 11β,17α,21-trihydroxy-16-methylene-4-pregnene-3,20-dione is filtered, washed with water, and dried in air.

EXAMPLE 12

*Preparation of 11β,17α,21-Trihydroxy-16-Methylene-4-Pregnene-3,20-Dione (16-Methylene Hydrocortisone)*

To a solution of 510 mg. of the 3,20-disemicarbazone of 11β,17α,21 - trihydroxy - 16 - methylene - 4 - pregnene-3,20-dione in 5 ml. of acetic acid is added 1.20 ml. of water and 0.50 ml. of pyruvic acid. The solution is kept at 25° C. for eighteen hours. Water (20 ml.) is added, and the mixture is extracted thoroughly with chloroform. The chloroform extract is dried over magnesium sulfate and taken to dryness. The residue is crystallized from acetone-ether to give pure 11β,17α,21-trihydroxy-16-methylene-4-pregnene-3,20-dione.

EXAMPLE 13

*Preparation of 11β,17α,21-Trihydroxy-16-Methylene-4-Pregnene-3,20-Dione 21-Acetate (16-Methylene Hydrocortisone Acetate)*

The product of the previous Example 12 is acetylated at C.—21 as follows: A solution of 100 mg. of 11β,17α,-21 - trihydroxy - 16 - methylene - 4 - pregnene - 3,20-dione in 1.0 ml. of pyridine and 0.5 ml. of acetic anhydride is prepared. After 18 hours at 25° C., the solution is taken to dryness in vacuo and the solid residue purified by crystallization in acetone-ether to give 11β,17α,21-trihydroxy-16-methylene-4-pregnene-3,20-dione 21-acetate.

EXAMPLE 14

*Preparation of 17α,21-Dihydroxy-16-Methylene-1,4-Pregnadiene-3,11,20-Trione*

Treatment of 17α,21-dihydroxy-16-methylene-4-pregnene-3,11,20-trione prepared as in Example 9 or the corresponding 21-acetate prepared as in Example 8 with *Bacillus sphaericus* under suitable conditions leads to 17α,21 - dihydroxy - 16 - methylene - 1,4 - pregnadiene-3,11,20-trione.

EXAMPLE 15

*Preparation of 2,4-Dibromo-17α,21-Dihydroxy-16-Methylene-3,11,20-Pregnanetrione 21-Acetate*

To a stirred solution of 200 mg. of 17α,21-dihydroxy-16-methylene-3,11,20-pregnanetrione 21-acetate (prepared as described in Example 5) in 4 ml. of chloroform and 0.05 ml. of acetic acid maintained at —15° C. is added dropwise one-half of a solution of 162 mg. of bromine in 0.47 ml. of chloroform and 0.53 ml. of acetic acid. The mixture is warmed to 0° C. and the remainder of the bromine added. Sodium acetate (0.1 g.) in 0.4 ml. of water is added followed by a few drops of 5% aqueous sodium sulfite. Additional chloroform and water are added and the mixture is extracted with chloroform. The chloroform layer is washed with aqueous potassium bicarbonate, aqueous sodium chloride and dried over magnesium sulfate. Evaporation of the solvent leaves as a residue 275 mg. of 2,4-dibromo-17α,21-dihydroxy - 16 - methylene - 3,11,20 - pregnanetrione 21 acetate.

EXAMPLE 16

*Preparation of 17α,21-Dihydroxy-16-Methylene-1,4-Pregnadiene-3,11,20-Trione 21-Acetate*

To a solution under nitrogen of 275 mg. of the 2,4-dibromo - 17α,21 - dihydroxy - 16 - methylene - 3,11,20-pregnanetrione 21-acetate in 3.3 ml. dimethyl formamide is added 53 mg. of sodium bromide. After 1 hour at 25° C. 0.66 ml. of dimethyl aniline is added and the mixture maintained at 135° C. for 2¼ hours. The mixture is cooled, added dropwise to dilute hydrochloric acid, and solid, crude product filtered, washed with dilute hydrochloric acid, water and dried in air. Treatment with charcoal, followed by chromatography on neutral alumina gives 17α,21-dihydroxy-16-methylene-1,4-pregnadiene-3,11,20-trione 21-acetate M.P. 214–217° C.;

$\lambda_{max.}^{CH_3OH}$ 238 mμ Em. 14,400; $[\alpha]_D^{Chf}$ + 123°

Analysis calculated for $C_{24}H_{28}O_6$.—C, 69.88; H, 6.84. Found: C, 69.96; H, 6.94.

EXAMPLE 17

*Preparation of 17α,21-Dihydroxy-16-Methylene-1,4-Pregnadiene-3,11,20-Trione*

This compound is obtained by treatment of 1.0 g. of 17α,21 - dihydroxy - 16 - methylene - 1,4 - pregnadiene-3,11,20 - trione 21-acetate in 30 ml. of methanol with 1 g. of potassium bicarbonate in 10 ml. of water under nitrogen at reflux temperature for 7 minutes. The mixture is cooled, neutralized with 1 ml. of acetic acid in 10 ml. of water, the methanol removed in vacuo and the product is extracted into ethyl acetate. Removal of the ethyl acetate gives 17α,21-dihydroxy-16-methylene-1,4-pregnadiene-3,11,20-trione.

EXAMPLE 18

*Preparation of 11β,17α,21-Trihydroxy-16-Methylene-1,4-Pregnadiene-3,20-Dione 21-Acetate*

The 1,2-dehydrogenation of 11β,17α,21-trihydroxy-16-methylene-4-pregnene-3,20-dione 21-acetate prepared as in Example 13 may be carried out microbiologically by means of *Bacillus sphaericus* to yield 11β,17α,21-trihydroxy-16-methylene-1,4-pregnadiene-3,20-dione, which on acetylation with acetic anhydride-pyridine gives 11β,17α,-21 - trihydroxy - 16 - methylene - 1,4 - pregnadiene - 3,20-dione 21-acetate.

EXAMPLE 19

*Preparation of the 3,20-Disemicarbazone of 9α-Fluoro-11β,17α,21 - Trihydroxy - 16α - Methyl - 1,4 - Pregnadiene-3,20-Dione*

A mixture of 1.00 g. of 9α-fluoro-11β,17α,21-trihydroxy-16α-methyl-1,4-pregnadiene-3,20-dione, 750 mg. of semicarbazide base, 280 mg. of semicarbazide hydrochloride in 20 ml. of methanol and 10 ml. of dimethylformamide is refluxed for 20 hours under nitrogen. The mixture is cooled to 20° C. and 100 ml. of water is added with stirring. The precipitated 3,20-disemicarbazone of 9α-fluoro-11β,17α,21-trihydroxy-16α-methyl-1,4-pregnadiene-3,20-dione is filtered, washed with water, and dried in air; M.P. over 300°;

$\lambda_{max.}^{CH_3OH}$ 292 mμ Em. 25,500; 240 mμ Em. 21,400

In similar manner are prepared the 3,20-disemicarbazone of 9α-fluoro-11β,17α,21-trihydroxy-16β-methyl-1,4-pregnadiene-3,20-dione, 3,20-disemicarbazone of 11β, 17α,21 - trihydroxy - 16α - methyl - 1,4 - pregnadiene-3,20-dione; 3,20-disemicarbazone of 11β,17α,21-trihydroxy - 16β - methyl - 1,4 - pregnadiene - 3,20 - dione; 3,20-disemicarbazone of 17α,21-dihydroxy-16α-methyl-1,4 - pregnadiene - 3,11,20 - trione; 3,20 - disemicarbazone of 17α,21 - dihydroxy - 16β - methyl - 1,4 - pregnadiene-3,11,20-trione; 3,20-disemicarbazone of 9α-fluoro-11β, 17α,21 - trihydroxy - 16α - methyl - 4 - pregnene - 3,20-dione; 3,20-disemicarbazone of 9α-fluoro-11β,17α,21-trihyrdroxy - 16β - methyl - 4 - pregnene - 3,20 - dione; 3,20-disemicarbazone of 11β,17α,21 - trihydroxy - 16α-methyl-4-pregnene-3,20-dione; 3,20-disemicarbazone of 11β,17α, 21 - trihydroxy - 16β - methyl - 4 - pregnene-3,20-dione; 3,20-disemicarbazone of 17α,21-dihydroxy-16α-methyl-4-pregnene-3,11,20-trione and 3,20-disemicarbazone of 17α,21-dihydroxy-16β-methyl-4-pregnene-3,11,20-trione.

EXAMPLE 20

*Preparation of 9α-Fluoro-11β,21-Dihydroxy-16-Methyl-1,4,16-Prepgatriene-3,20-Dione 21-Acetate*

A solution of 500 mg. of the 3,20-disemicarbazone of 9α - fluoro - 11β,17α,21 - trihydroxy - 16α - methyl - 1,4-pregnadiene-3,20-dione in 10 ml. of acetic acid and 0.5 ml. acetic anhydride is refluxed under nitrogen for one hour to produce the corresponding 3,20-disemicarbazone of 11β,21 - dihydroxy - 16 - methyl - 1,4,16 - pregnatriene-3,20-dione 21-acetate. The reaction mixture is cooled, 13 ml. of water is added and the mixture heated on the steam bath for 5 hours. It is then concentrated in vacuo nearly to dryness and water and chloroform added. The mixture is thoroughly extracted with chloroform, and the chloroform extract washed with excess aqueous potassium bicarbonate, saturated salt solution and dried over magnesium sulfate. Chromatography of the residue on neutral alumina and crystallization of pertinent benzene-chloroform fractions gives 9α-fluoro-11β,21 - dihydroxy - 16 - methyl - 1,4,16 - pregnatriene-3,20-dione 21-acetate; M.P. 228–233;

$\lambda_{max.}^{MeOH}$ 243 mμ Em. 22,000

Similar treatment of the 3,20-disemicarbazone of 9α-fluoro - 11β,17α,21 - trihydroxy - 16β - methyl - 1,4 pregnadiene-3,20-dione also leads to 9α-fluoro-11β,21-dihydroxy - 16 - methyl - 1,4,16 - pregnatriene - 3,20 - dione 21-acetate.

In a similar manner 11β,21-dihydroxy-16-methyl-1,4,16-pregnatriene-3,20-dione 21-acetate; 21-hydroxy - 16-methyl - 1,4,16 - pregnatriene - 3,11,20 - trione 21-acetate; 9α - fluoro - 11β,21 - dihydroxy - 16 - methyl-4,16-pregnadiene-3,20-dione 21-acetate; 11β,21-dihydroxy-16-methyl-4,16-pregnadiene-3,20-dione 21-acetate; and 21-hydroxy - 16 - methyl - 4,16 - pregnadiene - 3,11,20 - trione 21-acetate are obtained.

EXAMPLE 21

*Preparation of 9α-Fluoro-11β,21-Dihydroxy-16β-Methyl-16α,17α-Oxido-1,4-Pregnadiene-3,20-Dione 21-Acetate*

To a stirred solution of 500 mg. of 9α-fluoro-11β,21-dihydroxy - 16 - methyl - 1,4,16 - pregnatriene - 3,20-dione 21-acetate in 5 ml. of benzene and 5 ml. of chloroform are added 0.50 ml. of t-butyl hydroperoxide and 0.1 ml. of a 35% methanolic solution of benzyl-trimethyl ammonium hydroxide. After 18 hours at room temperature, water is added and the mixture thoroughly extracted with chloroform. The chloroform extract is washed with saturated aqueous sodium chloride and dried over magnesium sulfate. Evaporation of the solvent and crystallization of the residue from acetone-ether gives 9α - fluoro - 11β,21 - dihydroxy - 16β - methyl - 16α,17α-oxido-1,4-pregnadiene-3,20-dione 21-acetate.

In a similar manner are prepared 11β,21-dihydroxy-16β - methyl - 16α,17α - oxido - 1,4 - pregnadiene -3,20-dione 21-acetate; 21-hydroxy-16β-methyl-16α,17α-oxido-1,4-pregnadiene-3,11-20-trione 21-acetate; 9α-fluoro-11β,21 - dihydroxy - 16β - methyl - 16α,17α - oxido - 4 - pregnene-3,20-dione 21-acetate; 11β,21-dihydroxy-16β-methyl-16α,17α-oxido-4-pregnene-3,20-dione 21-acetate, and 21-hydroxy - 16β - methyl - 16α,17α - oxido - 4 - pregnene-3,11,20-trione 21-acetate.

EXAMPLE 22

*Preparation of 9α-Fluoro-11β,17α,21-Trihydroxy-16-Methylene-1,4-Pregnadiene-3,20-Dione 21-Acetate*

To a stirred solution of 600 mg. of 9α-fluoro-11β,21-dihydroxy-16β-methyl - 16α,17α - oxido - 1,4 - pregnadiene-3,20-dione 21-acetate in 10 ml. of acetic acid maintained at 10–15° C. is added 3 ml. of cold 10% hydrogen bromide in acetic acid. After 30 minutes the mixture is concentrated to dryness in vacuo (temp. 15°) and the residue chromatographed on neutral alumina. Combination of pertinent benzene-chloroform fractions and crystallization leads to the desired 9α-fluoro-11β,17α,21-trihydroxy-16-methylene - 1,4 - pregnadiene - 3,20 - dione 21-acetate.

In a similar manner are prepared 11β,17α,21-trihydroxy - 16 - methylene - 1,4 - pregnadiene - 3,20 - dione 21-acetate; 17α,21 - dihydroxy - 16 - methylene - 1,4-pregnadiene-3,11,20-trione 21-acetate; 9α-fluoro-11β,17α, 21-trihydroxy - 16 - methylene - 4 - pregnene -3,20 - dione 21 - acetate; 11β,17α,21-trihydroxy-16-methylene-4-pregnene-3,20-dione 21-acetate; and 17α,21-dihydroxy-16-methylene-4-pregnene-3,11,20-trione 21-acetate.

Alternatively, to a stirred solution of 600 mg. of 9α-fluoro - 11β,21 - dihydroxy - 16β - methyl - 16α,17α-oxido-1,4-pregnadiene-3,20-dione 21-acetate in 2.4 ml. of tetrahydrofuran is added 3.5 ml. of a 2:1 by weight mixture of hydrogen fluoride in tetrahydrofuran. After 2 hours at 15° the reaction mixture is pipetted slowly into excess cold aqueous sodium carbonate solution. The mixture is extracted with chloroform and the chloroform extract washed with water and saturated aqueous sodium chloride. Chromatography of the residue on neutral alumina as above also leads to the desired 9α-fluoro - 11β,17α,21 - trihydroxy - 16 - methylene - 1,4-pregnadiene-3,20-dione-21-acetate.

EXAMPLE 23

*Preparation of 9α-Fluoro-11β,17α,21-Trihydroxy-16-Methylene-1,4-Pregnadiene-3,20-Dione*

This compound is obtained by treatment of 200 mg. of the corresponding 21-acetate (the product of Example 22) in 10 ml. of methanol with 200 mg. of potassium bicarbonate in 3 ml. of water under nitrogen at reflux for 10 minutes. The mixture is cooled, neutralized with 0.3 ml. of acetic acid in 5 ml. of water, the methanol removed in vacuo and the product extracted into ethyl acetate. Concentration of the ethyl acetate gives crystalline 9α-fluoro-11β,17α,21-trihydroxy - 16 - methylene - 1,4 - pregnadiene-3,20-dione.

In a similar manner may be obtained 11β,17α,21-trihydroxy-16-methylene - 1,4 - pregnadiene-3,20-dione; 17α, 21-dihydroxy - 16 - methylene - 1,4 - pregnadiene-3,11,20-trione; 9α-fluoro-11β,17α,21-trihydroxy - 16 - methylene-4-pregnene-3,20-dione; 11β,17α,21-trihydroxy - 16 - methylene-4-pregnene - 3,20 - dione and 17α,21-dihydroxy-16-methylene-4-pregnene-3,11,20-trione.

EXAMPLE 24

*Preparation of 9α-Fluoro-11β,17α,21-Trihydroxy-16-Methylene-1,4-Pregnadiene-3,20-Dione*

100 mg. of 9α-fluoro-11β,17α,21-trihydroxy-16-methylene-4-pregnene-3,20-dione 21-acetate is prepared as described in Example 22, and is treated with *Bacillus sphaericus* to produce the corresponding 9α-fluoro-11β, 17α,21-trihydroxy-16-methylene - 1,4 - pregnadiene-3,20-dione.

EXAMPLE 25

*Preparation of 9α-Fluoro - 11β,17α,21 - Trihydroxy-16-Methylene-1,4-Pregnadiene-3,20-Dione 21-t-Butyl-Acetate*

To a stirred solution of 50 mg. of 9α-fluoro-11β,17α, 21-trihydroxy-16-methylene - 1,4 - pregnadiene-3,20-dione (the product of the previous example) in 0.5 ml. of pyridine at 10° is added 0.3 ml. of t-butylacetyl chloride. After two hours at 25° water is added and the precipitated product filtered, washed with dilute hydrochloric acid, dilute sodium bicarbonate solution, water and dried in air.

In a similar manner may be obtained the 21-t-butyl acetates of 11β,17α,21-trihydroxy-16-methylene-1,4-pregnadiene-3,20-dione; 17α,21-dihydroxy - 16 - methylene-1,4-pregnadiene - 3,11,20 - trione; 9α-fluoro-11β,17α,21-trihydroxy-16-methylene-4-pregnene - 3,20 - dione; 11β,17α, 21-trihydroxy-16-methylene-4-pregnene - 3,20 - dione and 17α,21-dihydroxy-16-methylene - 4 - pregnene-3,11,20-trione.

In an analogous manner may be prepared the corresponding 21-propionates 21-benzoates and other 21-esters of aliphatic and aromatic acids.

EXAMPLE 24

*Preparation of 9α-Fluoro-11β,17α,21-Trihydroxy-16-Methylene-1,4-Pregnadiene-3,20-Dione*

100 mg. of 9α-fluoro-11β,17α,21-trihydroxy-16-methylene-4-pregnene-3,20-dione 21-acetate is prepared as described in Example 22, and is treated with *Bacillus*

*sphaericus* to produce the corresponding 9α-fluoro-11β,17α,21-trihydroxy-16-methylene - 1,4 - pregnadiene-3,20-dione.

EXAMPLE 25

*Preparation of 9α-Fluoro - 11β,17α,21 - Trihydroxy-16-Methylene-1,4-Pregnadiene-3,20-Dione 21-t-Butyl-Acetate*

To a stirred solution of 50 mg. of 9α-fluoro-11β,17α,21-trihydroxy-16-methylene - 1,4 - pregnadiene-3,20-dione (the product of the previous example) in 0.5 ml. of pyridine at 10° is added 0.3 ml. of t-butylacetyl chloride. After two hours at 25° water is added and the precipitated product filtered, washed with dilute hydrochloric acid, dilute sodium bicarbonate solution, water and dried in air.

In a similar manner may be obtained the 21-t-butyl acetates of 11β,17α,21-trihydroxy-16-methylene-1,4-pregnadiene-3,20-dione; 17α,21-dihydroxy-16-methylene-1,4-pregnadiene - 3,11,20 - trione; 9α-fluoro-11β,17α,21-trihydroxy-16-methylene-4-pregnene - 3,20 - dione; 11β,17α,21-trihydroxy-16-methylene-4-pregnene-3,20-dione and 17α,21-dihydroxy-16-methylene-4-pregnene-3,11,20-trione.

In an analogous manner may be prepared the corresponding 21-propionates 21-benzoates and other 21-esters of aliphatic and aromatic acids.

EXAMPLE 26

*Preparation of 9α-Fluoro-17α,21-Dihydroxy-16-Methylene-1,4-Pregnadiene-3,11,20-Trione 21-Acetate*

To a stirred solution of 120 mg. of 9α-fluoro-11β,17α,21-trihydroxy-16-methylene - 1,4 - pregnadiene-3,20-dione 21-acetate in 3 ml. of glacial acetic acid is added 43 mg. of sodium dichromate in 2 ml. of glacial acetic acid at 20° C. The mixture is stirred at 20–25° for 3 hours, diluted with water and extracted with chloroform. The chloroform extract is washed with aqueous potassium bicarbonate solution, saturated sodium chloride solution, dried over magnesium sulfate and taken to dryness. Crystallization of the residue from acetone-ether gives 9α-fluoro-17α,21-dihydroxy-16-methylene - 1,4 - pregnadiene-3,11,20-trione 21-acetate. The corresponding 21-alcohol is obtained by treatment of the 21-acetate with aqueous methanolic potassium bicarbonate as described in Example 17.

In a similar manner 9α-fluoro-17α,21-dihydroxy-16-methylene-4-pregnene-3,11,20-trione 21-acetate and 21-alcohol are obtained from 9α-fluoro-11β,17α,21-trihydroxy-16-methylene-4-pregnene-3,20-dione 21-acetate.

Various changes and modifications may be made in the present invention, certain preferred embodiments of which are herein disclosed, without departing from the scope thereof; to the extent that these changes and modifications are within the scope of the appended claim, they are to be considered a part of this invention.

We claim:

9α-fluoro-11β,21-dihydroxy - 16β - methyl-16α,17α-oxido-1,4-pregnadiene-3,20-dione 21-acetate.

References Cited in the file of this patent

UNITED STATES PATENTS

| | | |
|---|---|---|
| 2,666,016 | Hechter et al. | Jan. 12, 1954 |
| 2,756,179 | Fried et al. | July 24, 1956 |
| 2,863,862 | Djerassi et al. | Dec. 9, 1958 |
| 2,865,808 | Agnello et al. | Dec. 23, 1958 |
| 2,867,630 | Pederson et al. | Jan. 6, 1959 |
| 2,867,633 | Lincoln et al. | Jan. 6, 1959 |
| 2,932,639 | Oliveto et al. | Apr. 12, 1960 |
| 2,932,656 | Day | Apr. 12, 1960 |
| 2,942,012 | Taub et al. | June 21, 1960 |
| 2,944,070 | Kollonitsch et al. | July 5, 1960 |
| 2,954,386 | Beyler | Sept. 27, 1960 |
| 2,966,504 | Taub et al. | Dec. 27, 1960 |

OTHER REFERENCES

Meystre et al.: Helv. Chim. Acta., vol. 39, pages 734–42 (1956).